United States Patent [19]

Saeda et al.

[11] Patent Number: 5,412,174
[45] Date of Patent: May 2, 1995

[54] WORK ROTATING APPARATUS FOR BEAM MACHINING HAVING TILT LIMITING STOPS

[75] Inventors: Koichi Saeda, Osaka; Shunji Sakura, Kyoto, both of Japan

[73] Assignee: Tsubakimoto Chain, Co., Osaka, Japan

[21] Appl. No.: 241,164

[22] Filed: May 10, 1994

[30] Foreign Application Priority Data

May 12, 1993 [JP] Japan .................. 5-029558

[51] Int. Cl.⁶ ............... B23K 26/02; B23K 26/08
[52] U.S. Cl. ................... 219/121.82; 219/121.6; 219/121.58; 219/159; 269/71; 269/74
[58] Field of Search .......... 219/121.82, 121.6, 121.58, 219/121.31, 121.85, 158, 159; 269/71–78

[56] References Cited

U.S. PATENT DOCUMENTS

| | | | |
|---|---|---|---|
| 4,422,628 | 12/1983 | Kasai | 269/71 |
| 4,502,457 | 3/1985 | Marron | 269/71 |
| 4,653,739 | 3/1987 | Moore | 269/61 |
| 4,726,577 | 2/1988 | Pontis | 269/71 |
| 4,838,531 | 6/1989 | Corsi | 269/21 |
| 5,156,382 | 10/1992 | Saeda et al. | |
| 5,174,586 | 12/1992 | Saeda et al. | |
| 5,204,507 | 4/1993 | Saeda et al. | |
| 5,214,980 | 6/1993 | Saeda et al. | |
| 5,221,824 | 6/1993 | Saeda et al. | |
| 5,224,716 | 7/1993 | Saeda et al. | |
| 5,239,160 | 8/1993 | Sakura et al. | |
| 5,316,277 | 5/1994 | Barks | 269/25 |

*Primary Examiner*—Mark H. Paschall
*Attorney, Agent, or Firm*—Howson and Howson

[57] ABSTRACT

A safety structure, for use in a work rotating apparatus for a laser beam machine having a manually rotatable shaft and work holder supported by a frame, comprises a pin and a pair of stops. The stops are separately located along a circular arc which is coaxial with the shaft. The stops contact the pin to limit the angle of rotation of the shaft which prevents the rotatable work holder, and the workpiece held by said work holder, from colliding with the frame.

2 Claims, 3 Drawing Sheets

1

WORK ROTATING APPARATUS FOR BEAM MACHINING HAVING TILT LIMITING STOPS

BRIEF SUMMARY OF THE INVENTION

This invention relates to improvements in a work rotating apparatus of the type used in conjunction with a laser beam machine tool. It is specifically concerned with a safety mechanism for preventing the unintended tilting of a rotatable work holder.

U.S. Pat. No. 5,204,507, to Saeda et al., describes a work rotating device for a laser beam machine tool. The work rotating apparatus comprises a work inclination angle setting mechanism. The workpiece is held by a work holder, which is supported one end of a rotatable shaft. In operation, an indexing pin is pulled out of a bore against the force of a spring. Manual operation of a lever at the other end of the shaft alters the inclination of the axis of rotation of the workpiece. Insertion of the indexing pin into another bore locks the workpiece at a different angle of inclination. Thereafter, laser beam machining is carried out on the workpiece.

The rotatable work holder of U.S. Pat. No. 5,204,507 uses a heavy chuck to grip the workpiece. The chuck engages the workpiece while a motor, connected to the chuck through a speed reducer, causes the workpiece to rotate.

Gravity may cause the work holder of U.S. Pat. No. 5,204,507 to tilt uncontrollably when an operator pulls the indexing pin out of the bore without holding the lever. The work holder may crash into the frame, thereby damaging the workpiece, the work holder, and the frame. The shock of the collision may also damage the internal structure of the speed reducer, which will adversely affect the accuracy of its rotation. The undesired tilting of the work holder under gravity may also result in injury if a hand or other portion of the body is caught between the frame and the work holder or workpiece.

The principal object of this invention is to provide an improved work rotating apparatus which restricts the unintended rotation of the work holder, thereby preventing the work holder from colliding with the frame. Another object of this invention is to prevent damage to the workpiece, the work holder, and the frame, while safeguarding the operator from injury.

In accordance with the invention, in a work rotating apparatus for a laser beam machine having first and second parts, the first part being a frame and the second part being a manually rotatable shaft supported by the frame for rotation about an axis, and having a rotatable work holder provided at one end of the shaft, a safety structure comprises a pin and a pair of stops. The pin is fixed to one of the parts, and the stops are fixed to the other part. The stops are disposed at separate locations on an arc coaxial with the axis. The pin is disposed at a distance from the axis such that it is engageable with each of the stops as the shaft rotates, whereby the work holder and work held by the work holder are prevented from colliding with the frame.

Further objects, details and advantages of the invention will be apparent from the following detailed description, when read in conjunction with the drawings.

DETAILED DESCRIPTION

Figure 4:
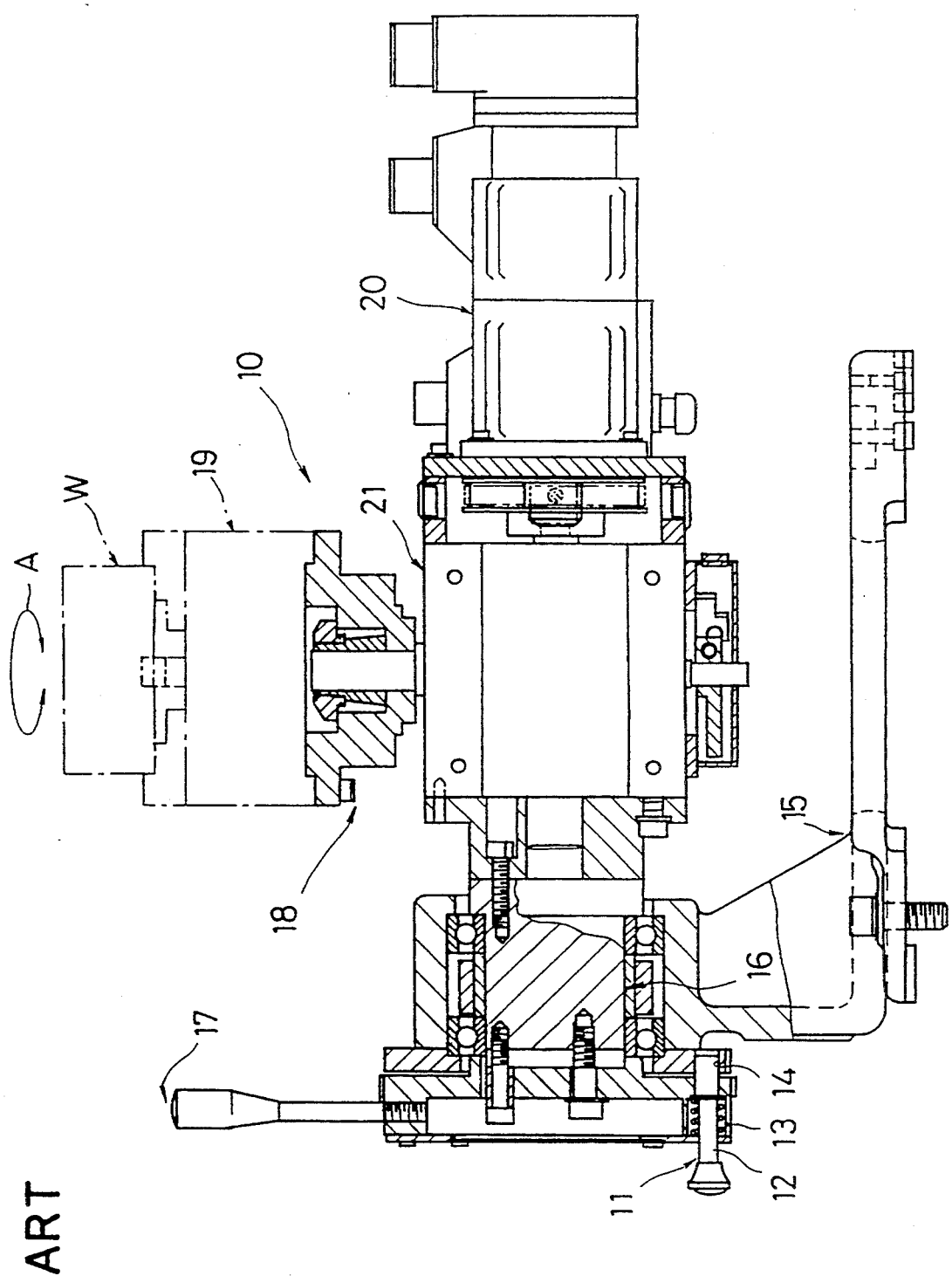
FIG. 4 is a partially broken away front elevational view of a work rotating apparatus for a laser beam machine tool of the prior art.

The work rotating apparatus 10 of the prior art, as shown in FIG. 4, comprises a rotatable work holder 18, a swing lever 17, a workpiece, and a manually rotatable shaft 16.

The work holder comprises a chuck 19, which holds a workpiece W in its jaws to rotate the workpiece in one or the other directions indicated by arrow A. The chuck is rotated by a motor 20 through a speed reducer 21, both being supported from frame 15 on shaft 16. Shaft 16 is rotatable manually by swing lever 17, and can be locked in any one of several rotational positions by means of a locking device 11, which comprises a pin 12 releasably urged by spring 13 into a locking hole 14 in a plate fixed to the frame.

The rotatable work holder 18 is described in U.S. Pat. No. 5,204,507, to Saeda et al., issued Apr. 20, 1993. The entire disclosure of U.S. Pat. No. 5,204,507 is incorporated by reference herein. The apparatus of U.S. Pat. No. 5,204,507 is subject to tilting out of control if the operator sets the angle of inclination without gripping the swing lever 17.

Figure 1:
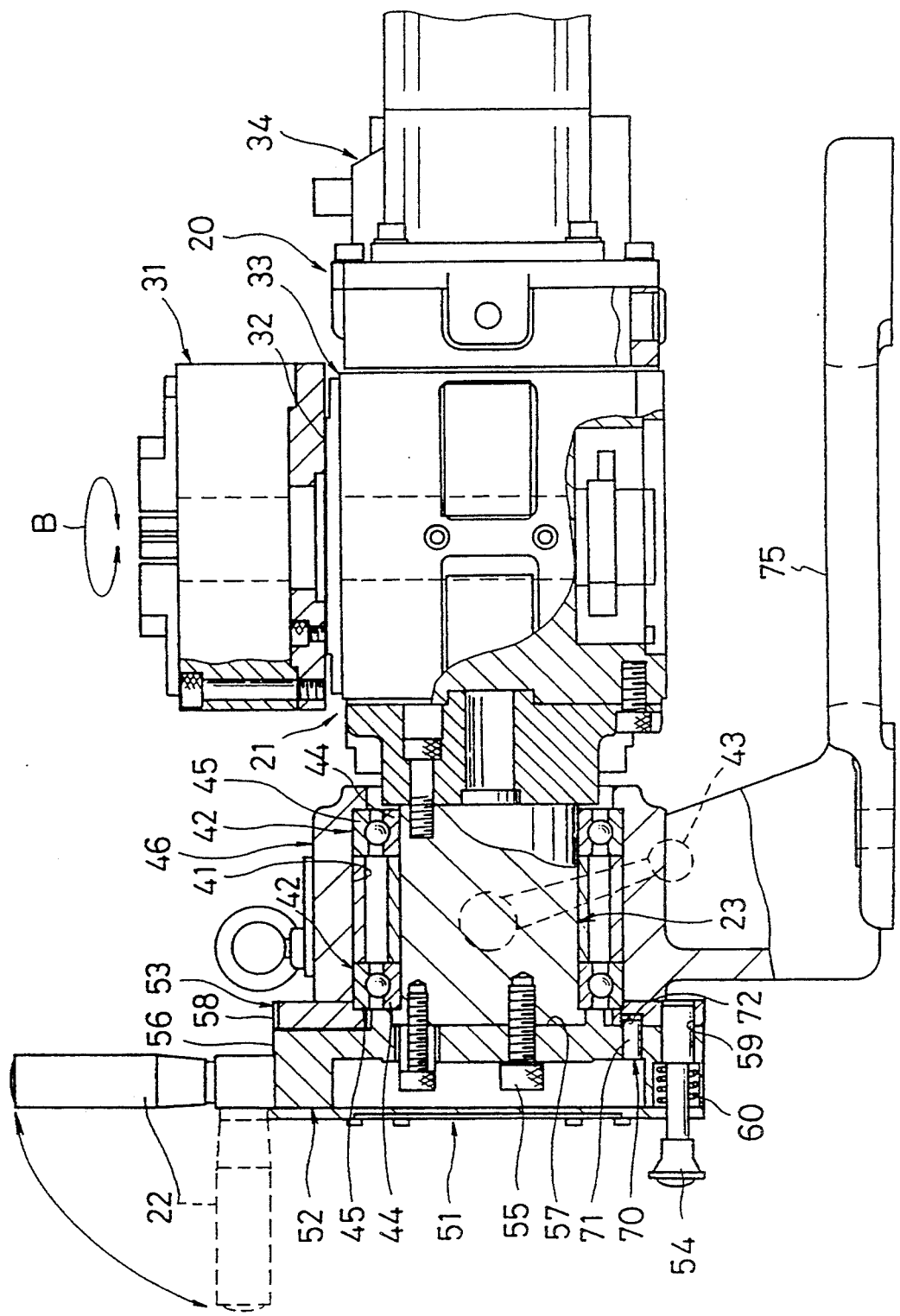
FIG. 1 is a partially broken away front elevational view of a work rotating apparatus for a laser beam machine tool equipped with apparatus for preventing the unintended rotation of the rotatable work holder.
Figure 2:
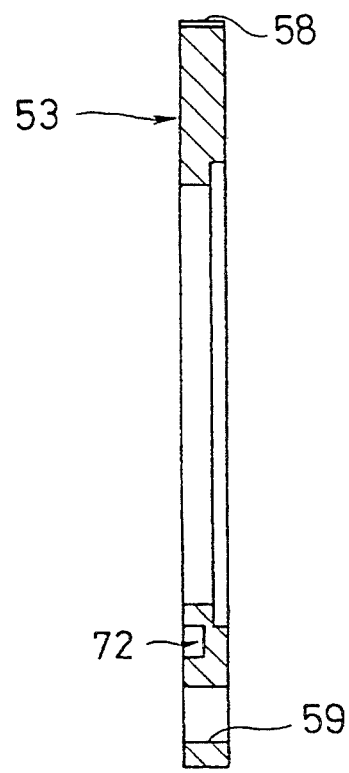
FIG. 2 is a sectional view of an inclination angle indexing disc.

The improved rotatable work holder 21 in accordance with the invention is shown in FIG. 1. It comprises a chuck 31 for holding a workpiece, a speed reducer 33, the output shaft 32 of which is connected to the chuck 31, and a motor 34 connected to the speed reducer 33. The workpiece held by the chuck 31 is rotated by the output shaft 32 of the speed reducer 33, which is itself rotated by the motor 34. The direction of rotation of the workpiece is indicated by B in FIG. 1.

A shaft 23, similar to the corresponding shaft 16 in FIG. 4, is rotatably supported by a pair of bearings 42. The bearings 42 are disposed within a through hole 41 formed in the frame 45.

The rotatable work holder 21 is mounted at an end of the shaft 23 so that it is supported, in cantilever fashion, over base 75 of the frame.

A locking lever 43 is provided on the frame 46 to lock shaft 23 against rotation relative to the frame 46.

A work inclination angle setting mechanism 51 is disposed between one end of the shaft 23 and the frame 46.

The work inclination angle setting mechanism 51 comprises a scale disc 52, an angle indexing disc 53, and an indexing pin 54.

The scale disc 52 is affixed to the left end of the rotatable shaft 23 by bolts 55. It is equipped with a swing lever 22, and an angle scale 56 on its periphery.

The scale disc 52 receives the end of the shaft 23 coaxially in the cylindrical bore 57, and preloads the inner races 44 of the bearings 42.

The inclination angle indexing disc 53 is mounted on the end surface of the frame 46. It is provided with a notch 58 for indicating the inclination angle in relation to the angle scale 56, and has three bores 59 into which the indexing pin 54 can be selectively inserted.

Figure 3:
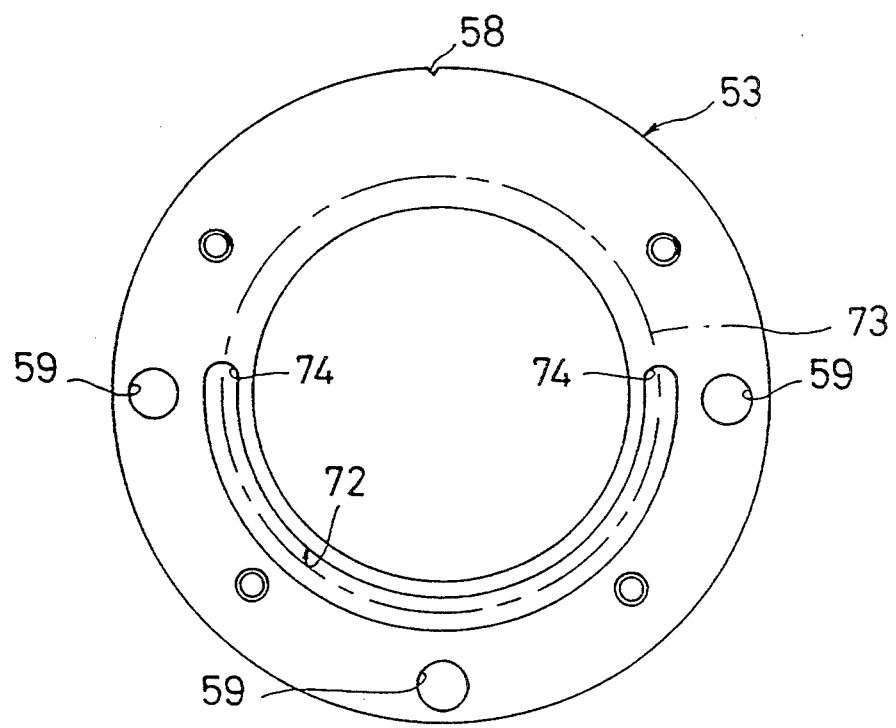
FIG. 3 is an elevational view of an inclination angle indexing disc, as seen from the left side of FIG. 1.

As shown in FIG. 3, the bores 59 are disposed ninety degrees apart along a circle which is coaxial with the rotatable shaft 23.

The indexing pin 54 is attached to the scale disc 52 and is normally urged toward the indexing disc 53 by a spring 60.

The safety structure 70 is provided between the scale disc 52 and the indexing disc 53. The safety structure 70 comprises a pin 71 secured to the scale disc 52, and a semicircular slot 72, in indexing disc 53, into which said pin 71 protrudes.

As shown in FIG. 3, the slot 72 is formed along a circle which is concentric with the rotatable shaft 23, and extends through an arc of approximately one hundred eighty degrees, ninety degrees in both directions from the location of the central bore 59.

Both ends 74 of the slot 72 are engageable by the pin 71 to limit the rotation of shaft 23.

In the operation of the safety structure just described, the operator pulls the indexing pin 54 out of a bore 59 against the urging force of the spring 60. The angle of inclination of the axis of rotation of the workpiece is adjusted by manual operation of the swing lever 22. This angle may be set as desired by inserting the indexing pin 54 into one of the other bores 59. Laser beam machining is carried out on a workpiece while it is rotating on the work holder 21.

The work holder 21 may tilt out of control if the operator pulls pin 54 without gripping the swing lever 22. The combined weight of the workpiece and the work holder 21 creates an unbalanced load on the shaft 23, causing it to rotate. When this happens, the pin 71 engages one or the other end 74 of the slot 72, thereby restricting the rotation of shaft 23 and limiting the movement of the work holder 21 and any workpiece held in the work holder 21.

Restriction of the rotation of the shaft 23 in this manner prevents the work holder 21 and workpiece from colliding with the base 75 of the frame 46. This prevents damage to the workpiece, the work holder 21, and the frame 46, and protects the operator from injury.

Various modifications can be made to the apparatus as described. For example, a pin may protrude from the indexing disc 53 into an arcuate slot formed on a face of the scale disc 52. Also, the slot may be eliminated, and suitable stops, for example stops in the form of pins, may be provided to obstruct the pin 71. Still other modifications can be made from the invention described herein without departing from the scope of the invention as defined in the following claims.

We claim:

1. In a work rotating apparatus for a laser beam machine having first and second parts, the first part being a frame and the second part being a shaft supported by said frame for rotation about a first axis, the frame having a portion disposed laterally with respect to said shaft, said work rotating apparatus also having work holding means provided on said shaft, means for rotating said work holding means about a second axis transverse to said first axis, means for manually rotating said shaft whereby said second axis can be tilted, and means for locking said shaft against rotation whereby the second axis can be fixed at any selected one of a plurality of inclinations, wherein the work holding means is positioned in relation to said frame so that, upon excessive rotation of said shaft in either direction, the work holding means, or work held thereby, can collide with said portion of the frame, the improvement comprising a pin, and a pair of stops, said pin being fixed to one of said first and second parts, and the stops being fixed to the other of said first and second parts, the stops being disposed at separate locations on an arc coaxial with said first axis, and the pin being disposed at a distance from said first axis such that it is engageable with one of said stops as the shaft rotates in first direction, and with the other of said stops as the shaft rotates in the opposite direction, the stops being positioned on said arc at locations such that the stops holding means or work held by said work holding means are prevented from colliding with said portion of the frame.

2. A work rotating apparatus according to claim 1 in which the work holding means is positioned in relation to the frame so that, upon excessive rotation of said shaft in either direction, the work holding means, in the absence of work held thereby, would collide with said portion of the frame, and in which the stops are positioned on said arc at locations such that the work holding means are prevented from colliding with said portion of the frame.

* * * * *